(No Model.) 3 Sheets—Sheet 1.
T. A. EDISON.
PHONOGRAPH.
No. 513,095. Patented Jan. 23, 1894.
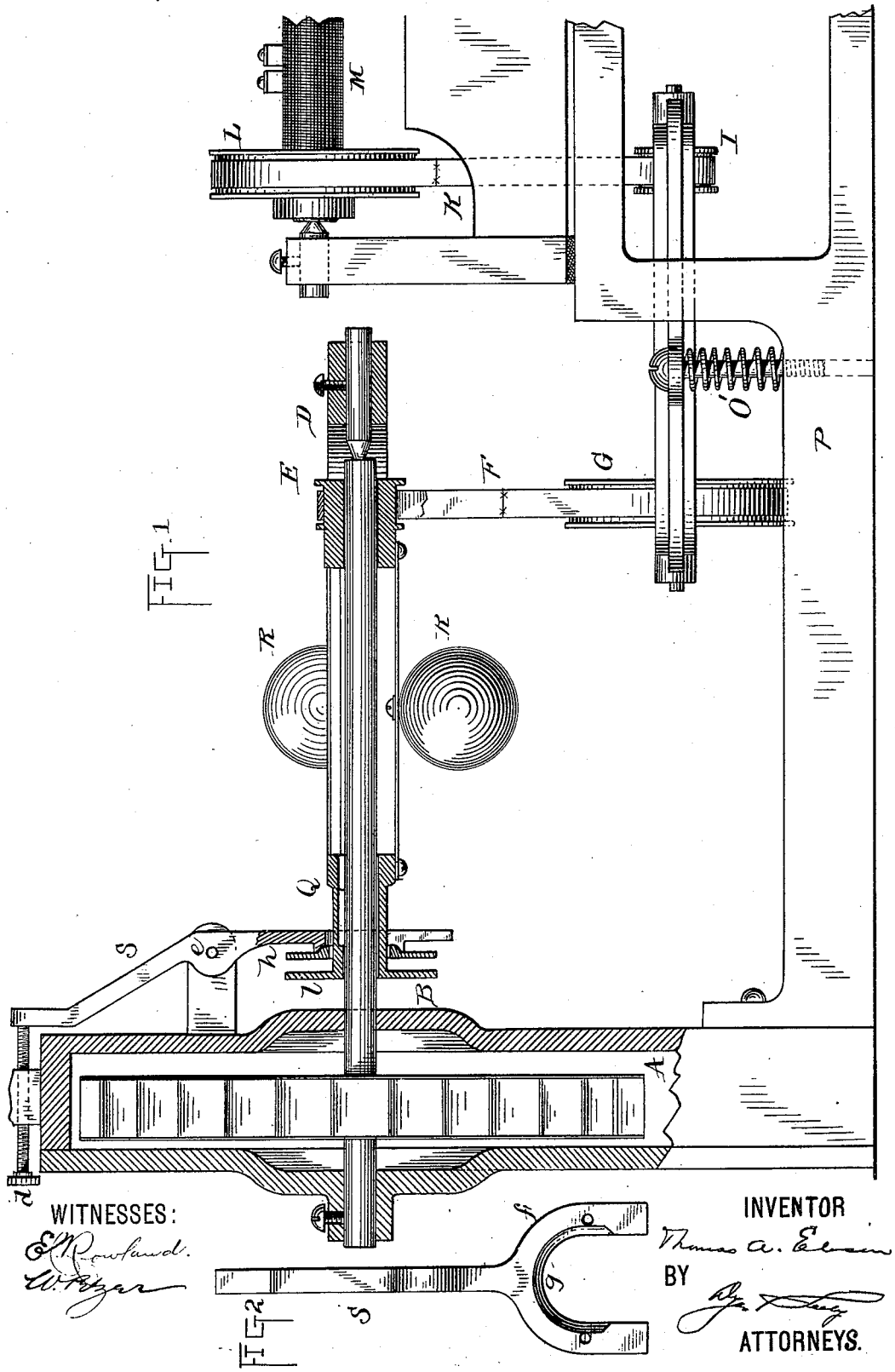
WITNESSES:
INVENTOR
Thomas A. Edison
BY
ATTORNEYS.

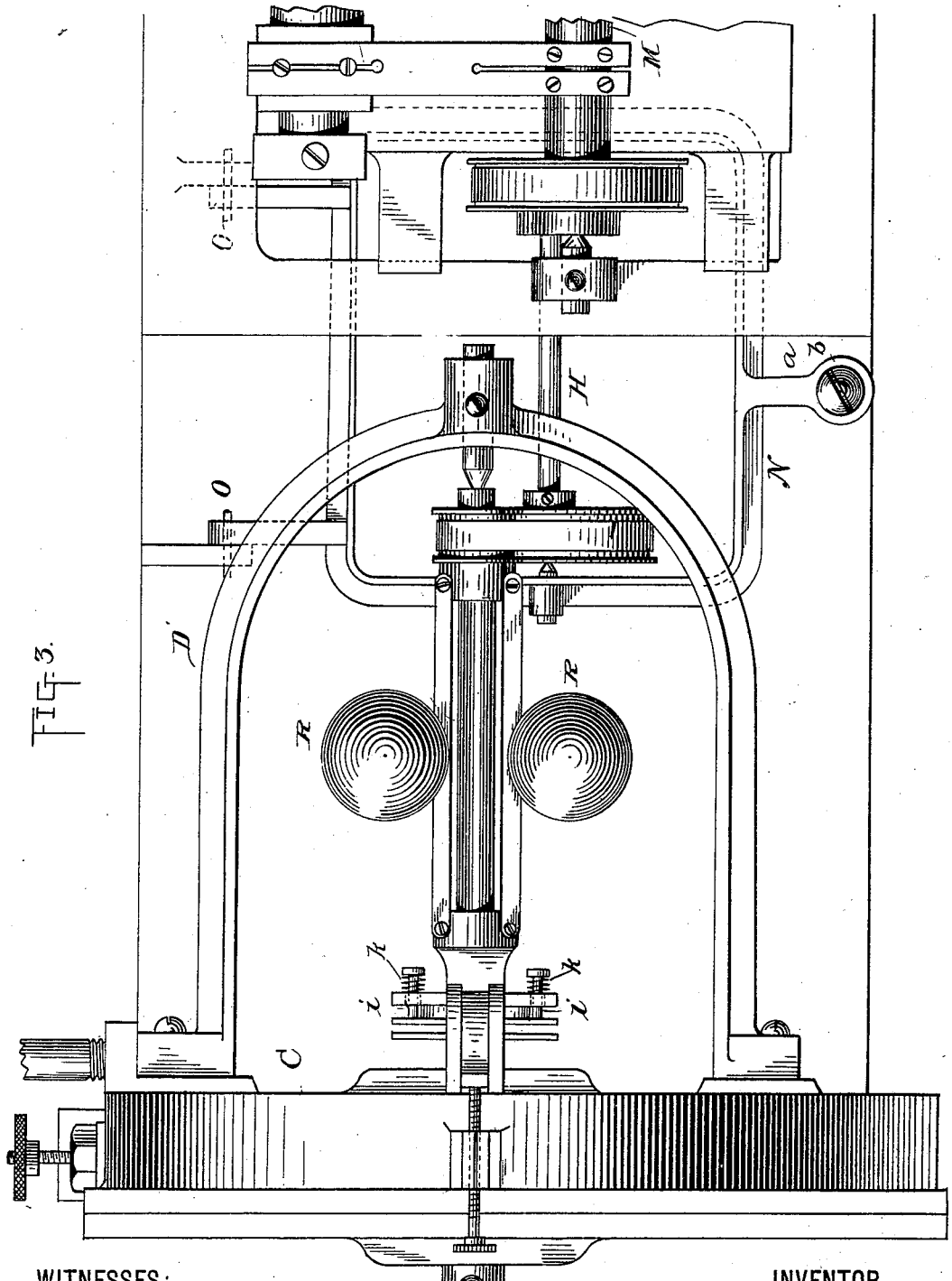

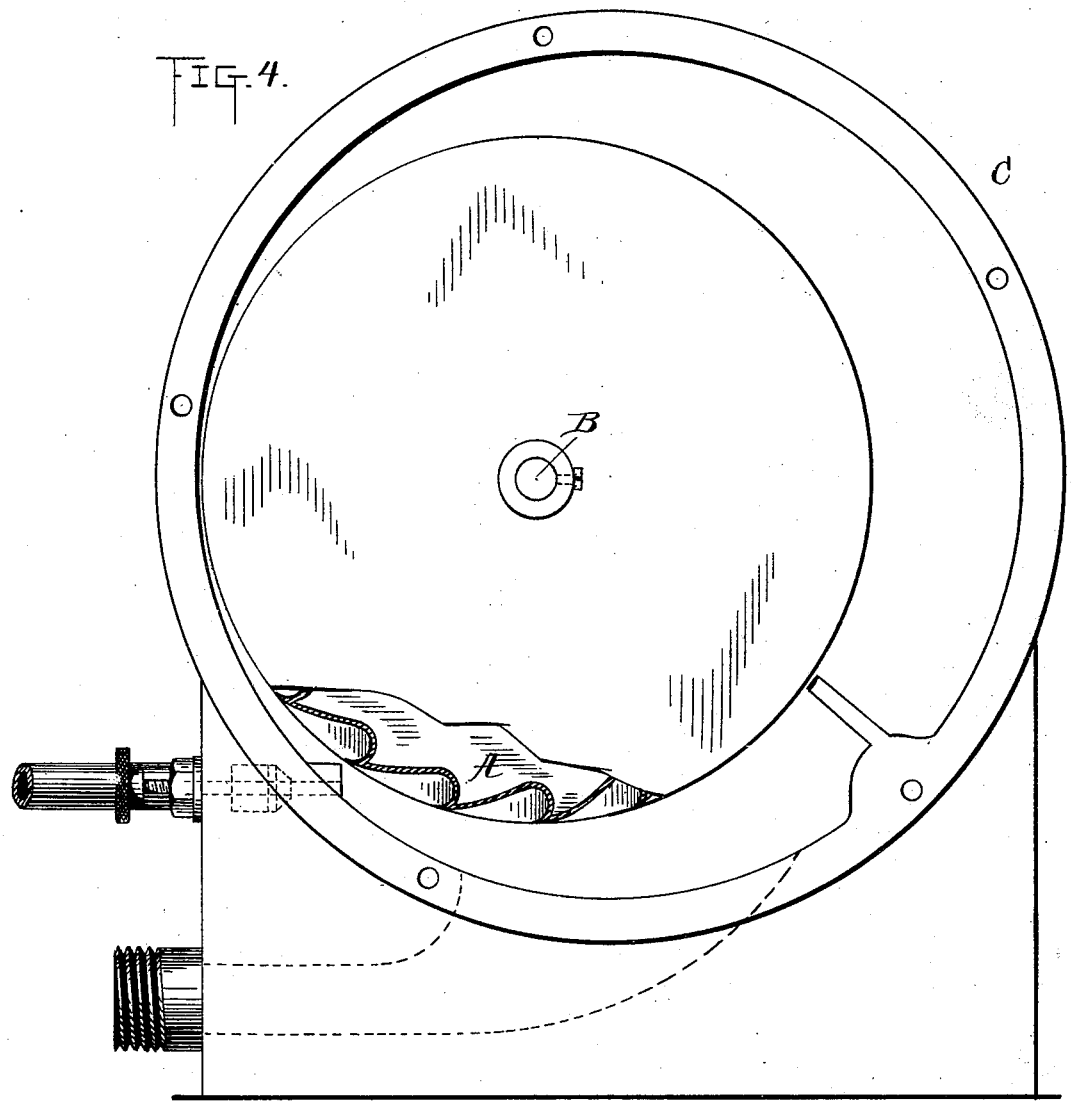

UNITED STATES PATENT OFFICE.

THOMAS A. EDISON, OF LLEWELLYN PARK, NEW JERSEY.

PHONOGRAPH.

SPECIFICATION forming part of Letters Patent No. 513,095, dated January 23, 1894.

Application filed December 27, 1889. Serial No. 335,140. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Phonographs, (Case No. 849,) of which the following is a specification.

This invention relates to motors for operating phonographs, to the connections between such motors and the phonograph itself, and to the devices for regulating the speed of the phonograph. I have heretofore usually employed an electric motor connected by belts with the feed screw of the phonograph and provided with a governor for regulating the speed which operated by breaking the motor circuit temporarily when the speed became too great. In my present invention I make use, preferably, of a hydraulic motor or water wheel placed on a shaft parallel with the feed screw and connected by belts and a countershaft which reduce the speed, with said feed screw. In connection with the motor I employ a centrifugal governor operating by the application of friction to a turning part and I make use of a loose friction shoe as one of the friction surfaces which always seats itself perfectly on the application of the friction and so makes the governing accurate and even.

My invention further includes a simple and effective arrangement for maintaining tension on the belts which connect the motor with the feed screw and for adjusting said tension when required.

My invention is illustrated in the accompanying drawings.

Figure 1 is a side elevation and partial section of the motor and governor and the connecting devices; Fig. 2, an elevation of the adjustable arm of the governor; Fig. 3, a top view of the motor governing and connecting devices, and Fig. 4, an end view of the motor with part of the case removed.

I have shown a simple form of water wheel A placed on the shaft B within the case C. A bracket D extends from the case C and supports the outer end of the shaft B. Upon said shaft is a pulley E connected by a belt F with a grooved wheel G on a spindle H which has also upon it a pulley I connected by a belt K with a grooved wheel L on the phonograph feed screw M, which, as will be understood, carries the phonogram cylinder (not shown). The wheels G and I are supported in bearings on a frame N, the rear portion of which is hinged at O. A lug $a$ extends from the front of the frame N and through this passes a screw $b$ which enters the supporting base P of the machine.

Upon the screw $b$ between the base P and frame N is coiled a spring O' so that the frame N is supported upon said spring and may be adjusted upon its hinges by adjusting the screw $b$ to alter the tension of said spring. The pulleys G and I being supported by the movable frame N below the relatively stationary pulleys E and L, it will be seen that the tension of the belts F and K is dependent upon the height to which said frame is adjusted and that the belts may therefore be both tightened or loosened by screwing the screw $b$ in or out.

Upon the shaft B is placed the sliding sleeve Q to which are attached the governor balls R. An arm S rests at its upper end against an adjusting screw $d$, is pivoted at $e$ and terminates at a fork $f$ through which the shaft B and sleeve Q pass. The fork $f$ has on its face a curved rim $g$ within which is a flanged disk $h$ placed loosely over the sleeve Q. The disk $h$ is held by pins $i$ which pass loosely through the sides of the fork $f$ and springs $k$ are placed between the fork and the heads of said screws, so that the disk $h$ is enabled to yield and to rock back toward the fork $f$, being however normally held parallel to the fork by the springs; at the inner end of the sleeve Q is a disk or flange $l$. It will be seen that when the speed of the motor becomes too great the governing balls will fly out and draw the disks $l$ against the disks $h$ whereby a friction is produced which will retard the motion and slacken the speed. The friction regulation shown and described is particularly adapted to use with the phonograph in which it is necessary that the regulation shall not be of uneven or jerky character.

While it is not essential in the phonograph that the speed shall be absolutely constant at all times, it is necessary for the best reproduction and especially for the reproduction of music that the speed of any short interval of time shall be substantially the same, that is for instance, that during any one revolution of the phonograph there shall be no substantial change of speed, since an alteration of speed under such circumstances will alter the pitch of the sound and so destroy any musical effect; by employing the loose friction shoe which will always engage the turning disk in the same position because it seats itself perfectly at all times against it this result is accomplished. With rigidly supported disks the necessary inaccuracies in mechanical construction will cause uneven friction at different parts of the same revolution and so the speed will vary at these times; but with the arrangement described the degree of friction will remain the same during the whole revolution. The degree of speed at which the friction will be applied may be determined by adjusting the screw $d$ so as to move the fork $f$.

The use of this character of governor is also particularly applicable to the operation of phonographs by water motors in which the speed is apt to be varied in consequence of variations in pressure and in which the ordinary mode of regulation by cutting off the supply will be likely to produce irregular variations of speed.

What I claim is—

1. In a phonograph, the combination of the feed-screw, a rotating motor having its shaft geared to said feed-screw, a centrifugal governor on the motor shaft, a friction disk connected with the governor, and another friction member with which said friction disk engages, one of said friction members being a rocking shoe, substantially as set forth.

2. In a phonograph, the combination of the feed-screw, a rotating motor having its shaft geared to said feed-screw, a centrifugal governor on the motor shaft, a friction disk connected with the governor, and a rocking spring supported stationary disk with which said friction disk engages, substantially as set forth.

3. In a phonograph, the combination of the feed screw, a rotating motor having its shaft geared to the feed screw, a centrifugal governor on the motor of the shaft, a friction disk connected with the governor, and another friction disk the same being stationary and pivoted and provided with a yielding support enabling it to rock on its pivot, substantially as set forth.

4. In a phonograph, the combination of the feed-screw, the rotating motor, the pulley on the shaft of the feed-screw, the pulley on the motor shaft, the two intermediate pulleys, the connecting belts and the adjustable frame carrying said intermediate pulleys, substantially as set forth.

This specification signed and witnessed the 11th day of December, 1889.

THOS. A. EDISON.

Witnesses:
D. H. DRISCOLL,
W. PELZER.